United States Patent [19]
Lorenz

[11] 3,832,388
[45] Aug. 27, 1974

[54] RESOLUTION OF 2-(P-HYDROXY)PHENYLGLYCINE
[76] Inventor: Roman R. Lorenz, 3 Highland Drive, Greenbush, N.Y. 12061
[22] Filed: Sept. 7, 1972
[21] Appl. No.: 287,136

[52] U.S. Cl. ............................ 260/471 A, 260/519
[51] Int. Cl. .......................................... C07c 101/06
[58] Field of Search ...................... 260/471 A, 519

[56] References Cited
UNITED STATES PATENTS
3,489,751   1/1970   Crast.................................. 260/519

Primary Examiner—Lorraine A. Weinberger
Assistant Examiner—L. A. Thaxton
Attorney, Agent, or Firm—Elmer J. Lawson; Frederik W. Stonner

[57] ABSTRACT

Optically pure D-(−)- and L-(+)-2-(p-hydroxyphenyl)-glycine, intermediates in the preparation of penicillin and cephalosporin derivatives, are prepared by chemical resolution of an ester of racemic 2-(p-hydroxyphenyl)glycine, employing L-(−)- or D-(+)-dibenzoyltartaric acid as resolving agent, and conversion to the free acid of the D-(−)- and L-(+)-2-(p-hydroxyphenyl)glycine ester so obtained.

22 Claims, No Drawings

RESOLUTION OF 2-(P-HYDROXY)PHENYLGLYCINE

This invention relates to processes for resolving an ester of D,L-(±)-2-(p-hydroxyphenyl)glycine, to processes for preparing optically active 2-(p-hydroxyphenyl)glycine, and to novel intermediates employed in said processes.

D-(−)-2-(p-hydroxyphenyl)glycine and L-(+)-2-(p-hydroxyphenyl)glycine, the optically active enantiomers of D,L-(±)-2-(p-hydroxyphenyl)glycine, are useful as intermediates in the preparation of penicillin and cephalosporin derivatives which are of value as antibacterial agents (see, for example, U.S. Pat. No. 3,489,751 and British specification 1,241,844). However, since the synthetic methods for preparing 2-(p-hydroxyphenyl)glycine yield this compound only in racemic form, resolution of D,L-(±)-2-(p-hydroxyphenyl)glycine into its enantiomers is required.

Known procedures for the resolution of the known D,L-(±)-2-(p-hydroxyphenyl)glycine into its enantiomers involves either a biochemical method or chemical method. In the biochemical method, the amino group of D,L-(±)-2-(p-methoxy-phenyl)glycine is protected by acylation and the N-acyl derivative is then asymmetrically hydrolyzed by the action of an acylase (e.g., hog kidney acylase), and the D-(−)-N-acyl-2-(p-methoxyphenyl)-glycine obtained is converted to the D-(−)-2-(p-hydroxyphenyl)-glycine. This procedure is not entirely satisfactory, particularly for large scale commercial production, since the use of an expensive enzyme is required. In the chemical method, an N-acyl or N,O-diacyl derivative of D,L-(±)-2-(p-hydroxyphenyl)glycine is treated with the resolving agent dehydroabietylamine (or $CO_2$ adduct thereof), and the (+) or (−)-diastereoisomeric salt respectively which preferentially crystallizes is converted to the corresponding optically active 2-(p-hydroxyphenyl)glycine. However, this method is also not entirely satisfactory for large scale commercial production due to low yields and the use of the expensive dehydroabietylamine.

In searching for a more facile, less expensive method for commercial separation of the enantiomers of D,L-(±)-2-(p-hydroxyphenyl)glycine, applicant converted the carboxylic acid moiety of D,L-(±)-2-(p-hydroxyphenyl)glycine to an ester and reacted the resulting D,L-(±)-2-(p-hydroxyphenyl)glycinate with the commercially available dibasic resolving agents, D-(+)- and L-(−)-dibenzoyltartaric acid. When the D-(+)- or L-(−)-dibenzoyl-tartaric acid and the glycinate were reacted in a mole to mole ratio (molar ratio of 1) or one mole to two mole ratio (molar ratio of ½), resolution of the diastereoisomeric salts could not be achieved. However, it was unexpectedly discovered that when a molar ratio of D-(+)- or L-(−)-dibenzoyl-tartaric acid to the D,L-(±)-2-(p-hydroxyphenyl)glycinate of greater than ½ to less than 1 is employed, preferential crystallization of the corresponding D-(−)-glycinate D-(+)-dibenzoylbitartrate or L-(+)-glycinate L-(−)-dibenzoylbitartrate respectively can be achieved in good yield. Treatment of the appropriate filtrate, as more fully described hereinbelow, from which the less soluble diastereoisomeric salt was separated, yields the L-(+)-glycinate D-(+)-dibenzoylbitartrate and D-(−)-glycinate L-(−)-dibenzoylbitartrate respectively. The appropriate diastereoisomeric salt so obtained is then converted, on treatment with an equivalent of a strong acid, to the corresponding optically active 2-(p-hydroxyphenyl)glycine ester acid-addition salt which is then hydrolyzed in the presence of a strong acid to give the corresponding optically active 2-(p-hydroxyphenyl)glycine acid-addition salt which is treated with an acid-acceptor to give optically active 2-(p-hydroxyphenyl)glycine.

The processes of this invention wherein L-(−)-dibenzoyltartaric acid is employed as resolving agent is preferred because of its ready availability from naturally occuring L-(+)-tartaric acid and hence relatively low cost.

In a first process aspect of this invention there is provided the process for the separation of D,L-(+)-2-(p-hydroxyphenyl)glycine into its optically active enantiomers which comprises the sequential steps of:

a. converting D,L-(±)-2-(p-hydroxyphenyl)glycine to a D,L-(±)-R 2-(p-hydroxyphenyl)glycinate, where R is selected from lower alkyl and benzyl;

b. reacting D,L-(±)-R 2-(p-hydroxyphenyl)glycinate with L-(−)-dibenzoyltartaric acid, in a mole ratio of said acid to said glycinate of from greater than 0.5 to less than 1, in a solvent selected from lower-alkanol and acetone;

c. diluting a solution so obtained with water to precipitate L-(+)-R 2-(p-hydroxyphenyl)glycinate L-(−)-dibenzoylbitartrate;

d. separating the L-(+)-R 2-(p-hydroxyphenyl)glycinate L-(−)-dibenzoylbitartrate;

e. adding to an aqueous solution from which said L-(+)-R 2-(p-hydroxyphenyl)glycinate L-(−)-dibenzoylbitartrate was separated about a molar amount of L-(−)-dibenzoyltartaric acid equal to the excess of the molar amount of D,L-(±)-R 2-(p-hydroxyphenyl)glycinate over that of the L-(−)-dibenzoyltartaric acid employed in step b to precipitate D-(−)-R 2-(p-hydroxyphenyl)glycinate L-(−)-dibenzoylbitartrate;

f. separating D-(−)-R 2-(p-hydroxyphenyl)glycinate L-(−)-dibenzoylbitartrate;

g. treating the D-(−)-R 2-(p-hydroxyphenyl)glycinate L-(−)-dibenzoylbitartrate with aqueous strong acid containing an excess of one equivalent of said strong acid to precipitate L-(−)-dibenzoyltartaric acid;

h. separating the precipitated L-(−)-dibenzoyltartaric acid;

i. heating a solution of the strong acid from which the L-(−)-dibenzoyltartaric acid was separated;

j. evaporating the strong acid solution to yield D-(−)-2-(p-hydroxyphenyl)glycine acid-addition salt;

k. dissolving the D-(−)-2-(p-hydroxyphenyl)glycine acid-addition salt in water and adding an acid acceptor to precipitate D-(−)-2-(p-hydroxyphenyl)-glycine; and l. separating the D-(−)-2-(p-hydroxyphenyl)glycine.

In a second process aspect of this invention there is provided a process which comprises the sequential steps of:

a. treating the L-(+)-R 2-(p-hydroxyphenyl)glycinate L-(−)-dibenzoylbitartrate obtained in the first process with aqueous strong acid containing an excess of one equivalent of said strong acid to precipitate L-(−)-dibenzoyltartaric acid;

b. separating the precipitated L-(−)-dibenzoyltartaric acid;

c. heating a solution of the strong acid from which the L-(−)-dibenzoyltartaric acid was separated;

d. evaporating the strong acid solution to yield L-(+)-2-(p-hydroxyphenyl)glycine acid-addition salt;

e. dissolving the L-(+)-2-(p-hydroxyphenyl)glycine acid-addition salt in water and adding an acid-acceptor to precipitate L-(+)-2-(p-hydroxyphenyl)glycine; and f. separating the L-(+)-2-(p-hydroxyphenyl)glycine.

In a third process aspect of this invention there is provided the process for the separation of D,L-(±)-2-(p-hydroxyphenyl)glycine into its optically active enantiomers which comprises the sequential steps of:

a. converting D,L-(±)-2-(p-hydroxyphenyl)glycine to a D,L-(±)-R 2-(p-hydroxyphenyl)glycinate, where R is selected from lower-alkyl and benzyl;

b. reacting D,L-(±)-R 2-(p-hydroxyphenyl)glycinate with D-(+)-dibenzoyltartaric acid, in a mole ratio of said acid to said glycinate of from greater than 0.5 to less than 1, in a solvent selected from lower-alkanol and acetone;

c. diluting a solution so obtained with water to precipitate D-(−)-R 2-(p-hydroxyphenyl)glycinate D-(+)-dibenzoylbitartrate;

d. separating the D-(−)-R 2-(p-hydroxyphenyl)glycinate D-(+)-dibenzoylbitartrate;

e. adding to an aqueous solution from which said D-(−)-R 2-(p-hydroxyphenyl)glycinate D-(+)-dibenzoylbitartrate was separated about a molar amount of D-(+)-dibenzoyltartaric acid equal to the excess of the molar amount of D,L-(±)-R 2-(p-hydroxyphenyl)glycinate over that of the D-(+)-dibenzoyltartaric acid employed in step b to precipitate L-(+)-R 2-(p-hydroxyphenyl)-glycinate D-(+)-dibenzoylbitartrate;

f. separating L-(+)-R 2-(p-hydroxyphenyl)glycinate D-(+)-dibenzoylbitartrate;

g. treating the L-(+)-R 2-(p-hydroxyphenyl)glycinate D-(+)-dibenzoylbitartrate with aqueous strong acid containing an excess of one equivalent of said strong acid to precipitate D-(+)-dibenzoyltartaric acid;

h. separating the precipitated D-(+)-dibenzoyltartaric acid;

i. heating a solution of the strong acid from which the D-(+)-dibenzoyltartaric acid was separated;

j. evaporating the strong acid solution to yield L-(+)-2-(p-hydroxyphenyl)glycine acid-addition salt;

k. dissolving the L-(+)-2-(p-hydroxyphenyl)glycine acid-addition salt in water and adding an acid-acceptor to precipitate L-(+)-2-(p-hydroxyphenyl)glycine; and l. separating the L-(+)-2-(p-hydroxyphenyl)glycine.

In a fourth process aspect of this invention there is provided the process which comprises the sequential steps of:

a. treating the D-(−)-R 2-(p-hydroxyphenyl)glycinate D-(+)-dibenzoylbitartrate obtained in the third process with aqueous strong acid containing an excess of one equivalent of said strong acid to precipitate D-(+)-dibenzoyltartaric acid;

b. separating the precipitated D-(+)-dibenzoyltartaric acid;

c. heating a solution of the strong acid from which the D-(+)-dibenzoyltartaric acid was separated;

d. evaporating the strong acid solution to yield D-(−)-2-(p-hydroxyphenyl)glycine acid-addition salt;

e. dissolving the D-(−)-2-(p-hydroxyphenyl)glycine acid-addition salt in water and adding an acid-acceptor to precipitate D-(−)-2-(p-hydroxyphenyl)glycine; and f. separating the D-(−)-2-(p-hydroxyphenyl)glycine.

In another aspect of this invention there are provided the novel compounds designated as L-(+)-R 2-(p-hydroxyphenyl)-glycinate D-(+)-dibenzoylbitartrate, D-(−)-R 2-(p-hydroxyphenyl)-glycinate D-(+)-dibenzoylbitartrate, L-(+)-R 2-(p-hydroxyphenyl)-glycinate L-(−)-dibenzoylbitartrate, and D-(−)-R 2-(p-hydroxyphenyl)glycinate L-(−)-dibenzoylbitartrate, where R is lower-alkyl or benzyl. Preferred compounds according to this aspect of the invention are those where R is methyl or ethyl. These compounds are useful as intermediates in the processes of this invention.

In a further aspect of this invention there is provided the novel compounds selected from the compounds designated as D,L-(±)-R 2-(p-hydroxyphenyl)glycinate, D-(−)-R 2-(p-hydroxyphenyl)glycinate and L-(+)-R 2-(p-hydroxyphenyl)glycinate, where R is lower-alkyl or benzyl. Preferred compounds according to this further aspect of this invention are those where R is lower-alkyl, particularly methyl and ethyl. These compounds are useful as intermediates in the processes of this invention.

The following discussions relating to the various reaction conditions employed in the several steps of the processes of this invention are made with reference to the first and third process aspects but are also applicable to the analogous steps in the second and fourth process aspects.

The D,L-(±)-R 2-(p-hydroxyphenyl)glycinate employed in step b can be prepared from the appropriate alcohols (ROH) using standard procedures, e.g., by refluxing an acidic solution of D,L-(±)-2-(p-hydroxyphenyl)glycine in the alcohol ROH, or, e.g., by treating the D,L-(±)-2-(p-hydroxyphenyl)glycine with the alcohol ROH in the presence of an equivalent of cyclohexylcarbodiimide, or other well known procedures.

In step b, as hereinbefore disclosed, the ratio of dibenzoyltartaric acid to glycinate is critical, i.e., must be greater than ½ (0.5) and less than 1. A preferred ratio is from about 0.7 to about 0.8.

In step c, varying the amount of water added will effect the purity and yield of the glycinate dibenzoylbitartrate. Thus, the lesser the amount of water added, the purer the product but the lower the yield and viceversa. A preferred ratio is about 1.32. A preferred solvent employed in step c is methyl or ethyl alcohol. Seeding with trace amounts of the desired diastereoisomeric salt is not necessary to initiate precipitation but is preferred since it results in a purer product.

In step e the molar amount of dibenzoyltartaric acid added is calculated by subtracting the number of moles of the dibenzoyltartaric acid employed in step b from the number of moles of glycinate employed in step b, i.e., the number of moles of dibenzoyltartaric acid employed in steps b and e combined is equal to about the number of moles of glycinate employed in step b; however, a slightly lesser or greater molar amount than the molar amount so calculated may be employed in step e. As is the case in step c, seeding with trace amounts of the diastereoisomeric salt is not necessary but is preferred.

In step g, an equivalent of strong acid means 1 mole of said strong acid per mole of the glycinate dibenzoylbitartrate. Only a slight excess of strong acid (e.g. 1.1 equivalents) may be employed but to ensure reasonably rapid reaction in subsequent step i, the addition of at least 2 equivalents of strong acid is preferred. Such strong acid may be any suitable acid, well known in the art, capable of hydrolyzing the glycinate to glycine in step i. Such acids are illustrated by, but not limited to, hydrochloric acid, hydrobromic acid, sulfuric acid, sulfamic acid, methanesulfonic acid, p-toluene-sulfonic acid and the like.

In step h the precipitate is in crystalline form and said crystals are readily separated by filtration but other known methods of separation can be employed.

The acid hydrolysis of the glycinate to the glycine salt (step i) involves a standard procedure. The length of time required to heat the strong acid solution of the glycinate will vary, depending on the amount of strong acid added in step g. The temperature at which the hydrolysis is carried out may vary between room temperature and the boiling point of the solution. If at least two equivalents of strong acid is added in step g and the solution is heated at reflux, a reaction time of about one hour in step i is satisfactory to effect complete conversion to the glycine acid-addition salt.

In step k, any water soluble acid-acceptor having sufficient basicity to decompose the glycine acid-addition salt is suitable. Such acid-acceptors are, for example, ammonium hydroxide, alkali metal hydroxides, e.g., sodium and potassium hydroxide, alkali metal carbonates and bicarbonates, e.g., sodium and potassium carbonate and sodium and potassium bicarbonate, and the like. While less than an equivalent of acid-acceptor to the glycine acid-addition salt may be employed, optimum yields are obtained by employing at least one equivalent of acid-acceptor.

In the processes of this invention, pure resolving agent can be readily recovered in good yield. Furthermore, if either one of the two enantiomers of D,L-(±)-2-(p-hydroxyphenyl)glycine is desired, the undesired enantiomer in the ester form, obtained by the processes of this invention, can be readily racemized, either by heating above its melting point, or by stirring a basic solution thereof in water for several minutes. Thus by recyclization of the D,L-(±)-ester of 2-(p-hydroxyphenyl)glycine so obtained and the recovered resolving agent in the processes of this invention, it is possible to economically obtain the desired optically active 2-(p-hydroxyphenyl)glycine in high yield.

Throughout this specification the term lower-alkyl means such groups containing from one to six carbon atoms which can be arranged as straight or branched chains as illustrated by, but not limited to, methyl, ethyl, propyl, isopropyl, butyl, tert-butyl, pentyl, hexyl and the like.

Throughout this specification the term lower-alkanol means such alkanols containing from one to three carbon atoms as illustrated by methanol, ethanol, propanol and isopropanol.

The molecular structure and optical purity of the enantiomers of D,L-(±)-2-(p-hydroxyphenyl)glycine and of the novel compounds of this invention obtained by the processes of this invention was determined on the basis of the method of their synthesis, a study of their optical rotations, and in some cases, by a study of their nuclear magnetic resonance (NMR) spectra, and confirmed by the correspondence between calculated and found values for the elementary analyses.

The processes of this invention are illustrated by the following examples:

Example 1

A. D,L-(±)-Ethyl 2-(p-hydroxyphenyl)glycinate

A total of about 80 g. of anhydrous hydrogen chloride was passed rapidly into a suspension of 250 g. (1.59 mole) of D,L-(±)-2-(p-hydroxyphenyl)glycine in 2.5 l. of absolute ethanol without cooling. All of the amino acid went into solution during the addition. The solution was refluxed for 16 hours and concentrated to dryness. The solid residue was dried at 60°C. in vacuo for 3 hours. The crude hydrochloride salt weighed 349 g. (100 percent). This material was dissolved in 1.2 l. of cold water and concentrated ammonium hydroxide was added until a pH of 8.0 was obtained. Crystallization was immediate and after cooling to 5°C. the product was filtered, pressed well on the funnel and washed two times with 50 ml. of ice water. After drying at 60°C. in vacuo for 16 hours, the crude base weighed 275.5 g. (94.5 percent), m.p. 155°–158°C. The base was dissolved in 1.6 l. of boiling absolute ethanol and charcoaled (using a steam-jacketed funnel). After cooling at −10°C. for 2 ½ hours, the product was filtered and washed two times with 30 ml. of cold absolute ethanol. After drying in vacuo for 16 hours at 60°C., there was obtained 261.5 g. (89.5 percent) of D,L-(±)-ethyl 2-(p-hydroxyphenyl)glycinate, m.p. 160°–161°C.

B. Resolution of D,L-(±)-Ethyl 2-(p-hydroxyphenyl)glycinate

A mixture of 100 g. (0.5125 mole) of D,L-(±)-ethyl 2-(p-hydroxyphenyl)glycinate and 141.6 g. (0.3755 mole) of L-(−)-dibenzoyltartaric acid monohydrate in 650 ml. of absolute ethanol was stirred at room temperature until solution was complete (about ½ hour). The solution was filtered and the flask and filter were rinsed with 80 ml. of absolute ethanol. To the clear filtrate was added 960 ml. of water and the solution was seeded with a trace amount of L-(+)-ethyl 2-(p-hydroxyphenyl)glycinate L-(−)-dibenzoylbitartrate and stirred until crystallization had well progressed. After standing 1 hour at room temperature, the mixture was cooled overnight at 4°C. The precipitated L-(+)-ethyl 2-(p-hydroxyphenyl)glycinate L-(−)-dibenzoylbitartrate was filtered. The filter cake was pressed well and then washed two times with 50 ml. of cold 25 percent ethanol (1:3 ethanol-water). The L-(+)-ethyl 2-(p-hydroxyphenyl)glycinate L-(−)-dibenzoyltartrate, after drying at 60°C. in vacuo, weighed 122 g. (86 percent), m.p. 171°–174°C. (dec.), $[\alpha]_D^{25}$ −36° (C=1 percent, MeOH). (This salt can be obtained pure by dissolving it in 14 volumes of refluxing 25 percent ethanol and allowing the mixture to stand at room temperature for 24 hours. The recovery is 85 percent, m.p. 180°–181°C. (dec.), $[\alpha]_D^{25}$ −32.2° (C=1 percent, MeOH).

The filtrate from above (including the 2 × 50 ml. washes) was treated immediately with a solution of 51.8 g. (0.1375 mole) of L-(−)-dibenzoyltartaric acid monohydrate in 125 ml. of absolute ethanol with good stirring and seeded with a trace amount of D-(−)-ethyl 2-(p-hydroxyphenyl)glycinate L-(−)-dibenzoylbitartrate. Crystallization was heavy after about 15 minutes.

The mixture was allowed to stand 1 hour at room temperature and then it was cooled at 0°C. for 2 hours. The resulting precipitate was filtered, the filter cake was pressed well, then washed three times with 50 ml. of cold 25 percent ethanol, and dried at 60°C. in vacuo for 48 hours to give 124 g. (87.5 percent) of D-(−)-ethyl 2-(p-hydroxyphenyl)glycinate L-(−)-dibenzoylbitartrate, m.p. 160°–161°C., $[\alpha]_D^{25}$ − 125.3° (C=1 percent, MeOH). This product (40 gm) was dissolved in 480 ml. of 35 percent ethanol and allowed to crystallize by standing at room temperature for 24 hours. The crystals were filtered, pressed well and washed two times with 20 ml. of 25 percent ethanol. After drying at 60°C. in vacuo for 20 hours, the optically pure D-(−)-ethyl 2-(p-hydroxyphenyl)glycinate L-(−)-dibenzoylbitartrate weighed 34.5 gm (86.4 percent recovery), m.p. 161°–163°C. (dec.), $[\alpha]_D^{25}$ −131.6° (C=1 percent, MeOH).

C. D-(−)-2-(p-Hydroxyphenyl)glycine hydrochloride

A mixture of 25 g. of (0.0452 mole) of D-(−)-ethyl 2-(p-hydroxyphenyl)glycinate L-(−)-dibenzoylbitartrate, $[\alpha]_D^{25}$ −131.6° (C=1 percent, MeOH), in 190 ml. of 2N hydrochloric acid was stirred at room temperature and seeded with a few crystals of L-(−)-dibenzoyltartaric acid monohydrate. Crystallization was rapid and after stirring ½ hour at room temperature, the precipitated L-(−)-dibenzoyltartaric acid monohydrate was filtered, pressed well and washed three times with 15 ml. of 2N hydrochloric acid.

The combined filtrates were refluxed for 1 hour and then concentrated in vacuo at 40°C. The white crystalline residue was dried at 60°C. in vacuo to yield 9.7 g. of product. This was slurried in 40 ml. of glacial acetic acid for 20 minutes at room temperature. The product was filtered, washed once with 5 ml. of acetic acid and then with a few ml. of ether. After drying overnight at 60°C. in vacuo, the white crystals of D-(−)-2-(p-hydroxyphenyl)glycine hydrochloride weighed 8.7 g. (97 percent), m.p. 207°–208°C. (dec.), $[\alpha]_D^{25}$ −110° (C=1 percent, H₂O), $[\alpha]_D^{25}$ −154° [1 percent (calculated as base) in 1N hydrochloric acid]. [The precipitated L-(−)-dibenzoyltartaric acid monohydrate after drying at room temperature for 2 days weighed 16.5 g. (97.5 percent of theory). It was recrystallized by dissolving it in 2.85 volumes of hot chloroform and allowing this solution to cool to room temperature. After addition of 1.35 volumes of benzene, the mixture was cooled at 4°C. overnight. The recovery was 89 percent, m.p. 89°–93°C., $[\alpha]_D^{25}$ −108° (C=5 percent, EtOH ].

D. D-(−)-2-(p-Hydroxyphenyl)glycine

To a solution of 4.07 g. (0.02 mole) of D-(−)-2-(p-hydroxyphenyl)glycine hydrochloride ($[\alpha]_D^{25}$ −110° (C=1 percent, H₂O) in 12 ml. of water was added slowly with slight cooling 1.2 ml. of concentrated ammonium hydroxide. To the resulting gelatinous precipitate was added an additional 10 ml. of water and the mixture was warmed to about 45°C. The solution was cooled and the precipitate was filtered, washed with 5 ml. of ice water, and dried at 80°C. in vacuo to yield 2.55 g. (76.5 percent) of D-(−)-2-(p-hydroxyphenyl)glycine as white crystals, m.p. 224°C. (dec.) $[\alpha]_D^{25}$ −156.8° (C=1 percent, 1N HCl).

By following the procedure described in Example 1C but substituting L-(+)-ethyl 2-(p-hydroxyphenyl)glycinate L-(−)-dibenzoylbitartrate for the D-(−)-ethyl 2-(p-hydroxyphenyl) glycinate L-(−)-dibenzoylbitartrate there is obtained L-(+)-2-(p-hydroxyphenyl)glycine hydrochloride which, when substituted for D-(−)-2-(p-hydroxyphenyl)glycine hydrochloride in Example 1D, yields L-(+)-2-(p-hydroxyphenyl)glycine.

When the procedure described in Example 1B was repeated, but using 0.5 mole of L-(−)-dibenzoyltartaric acid and 1.0 mole of D,L-(±)-ethyl 2-(p-hydroxyphenyl)glycinate, no crystalline material precipitated, even with seeding.

When the procedure described in Example 1B was repeated, but using 48.1 g. (0.128 mole) of L-(−)-dibenzoyltartaric acid and 25.0 g. (0.128 mole) of D,L-(±)-ethyl 2-(p-hydroxyphenyl)-glycinate, there was obtained a quantitative yield (73.0 g.) of crystalline D,L-(±)-ethyl 2-(p-hydroxyphenyl)glycinate L-(−)-dibenzoyltartrate, m.p. 162°–163°C., $[\alpha]_D^{25}$ −77.1° (C=1 percent, MeOH).

Example 2

Following the procedure described in Example 1B but using D-(+)-dibenzoyltartaric acid there was obtained D-(−)-ethyl 2-(p-hydroxyphenyl)glycinate D-(+)-dibenzoylbitartrate (88 percent yield), m.p. 180°–180.5°C. (dec.) (25 percent ethanol), $[\alpha]_D^{25}$ +29.4° (C=1 percent, MeOH).

By substituting D-(−)-ethyl 2-(p-hydroxyphenyl)-glycinate D-(+)-dibenzoylbitartrate for the D-(−)-ethyl 2-(p-hydroxyphenyl)glycinate L-(−)-dibenzoylbitartrate in Example 1C there is obtained D-(−)-2-(p-hydroxyphenyl)-glycine hydrochloride which is converted to D-(−)-(p-hydroxyphenyl)glycine following the procedure described in Example 1D.

FOllowing the procedure described in Example 1B there is obtained from the filtrate from which the D-(−)-ethyl 2-(p-hydroxyphenyl)glycinate D-(+)-dibenzoylbitartrate was separated L-(+)-ethyl 2-(p-hydroxyphenyl)glycinate D-(+)-dibenzoylbitartrate which, when substituted for D-(−)-ethyl 2-(p-hydroxyphenyl)-glycinate L-(−)dibenzoylbitartrate in Example 1C yields L-(+)-2-(p-hydroxyphenyl)glycine hydrochloride which is converted, as described hereinabove, to L-(+)-2-(p-hydroxyphenyl)-glycine.

Racemization of D-(−)-Ethyl 2-(p-hydroxyphenyl)-glycinate

D-(−)-ethyl 2-(p-hydroxyphenyl)glycinate L-(−)-dibenzoylbitartrate (18.5 g.) in 60 ml. of water was treated with 5.2 ml. of ammonium hydroxide in 10 ml. of water (precipitation of free glycinate was immediate) and stirred 5 minutes. The resulting precipitate was filtered, washed with a small amount of water, and dried at 60°C. in vacuo to give 5.0 g. (80 percent) of D-(−)-ethyl 2-(p-hydroxyphenyl)glycinate, m.p. 129°–130°C. $[\alpha]_D^{25}$ −109.2° (C=1 percent, HCl). This D-(−)-ethyl 2-(p-hydroxyphenyl)-glycinate was heated at about 146°C., cooled, and crystallized from absolute ethanol to give D,L-(±)-ethyl 2-(p-hydroxyphenyl)-glycinate, m.p. 157°–159°C.

Alternatively, to a solution of D-(−)-ethyl 2-(p-hydroxyphenyl)glycinate L-(−)-dibenzoylbitartrate in water containing ether (to prevent precipitation of the free glycinate when formed) was added sodium bicarbonate solution until the solution was basic. After one hour the ether was evaporated in vacuo, and the D,L-ethyl 2-(p-hydroxyphenyl)glycinate (m.p. 160°–161°C) precipitated immediately.

I claim:

1. A process for the separation of D,L-(±)-2-(p-hydroxyphenyl)glycine into its optically active enantiomers which comprises the sequential steps of:
   a. converting D,L-(±)-2-(p-hydroxyphenyl)glycine to a D,L-(±)-R 2-(p-hydroxyphenyl)glycinate, where R is selected from lower-alkyl and benzyl;
   b. reacting said D,L-(±)-R 2-(p-hydroxyphenyl)glycinate with L-(−)-dibenzoyltartaric acid, in a mole ratio of said acid to said glycinate of from greater than 0.5 to less than 1, in a solvent selected from lower-alkanol and acetone;
   c. diluting a solution so obtained with water to precipitate L-(+)-R 2-(p-hydroxyphenyl)glycinate L-(−)-dibenzoylbitartrate;
   d. separating the L-(+)-R 2-(p-hydroxyphenyl)glycinate L-(−)-dibenzoylbitartrate;
   e. adding to an aqueous solution from which said L-(+)-R 2-(p-hydroxyphenyl)glycinate L-(−)-dibenzoylbitartrate was separated about a molar amount of L-(−)-dibenzoyltartaric acid equal to the excess of the molar amount of D,L-(±)-R 2-(p-hydroxyphenyl)glycinate over that of the L-(−)-dibenzoyltartaric acid employed in step b to precipitate D-(−)-R 2-(p-hydroxyphenyl)glycinate L-(−)-dibenzoylbitartrate;
   f. separating D-(−)-R 2-(p-hydroxyphenyl)glycinate L-(−)-dibenzoylbitartrate;
   g. treating the D-(−)-R 2-(p-hydroxyphenyl)glycinate L-(−)-dibenzoylbitartrate with aqueous strong acid containing an excess of one equivalent of said strong acid to precipitate L-(−)-dibenzoyltartaric acid;
   h. separating the precipitated L-(−)-dibenzoyltartaric acid;
   i. heating a solution of the strong acid from which the L-(−)-dibenzoyltartaric acid was separated;
   j. evaporating the strong acid solution to yield D-(−)-2-(p-hydroxyphenyl)glycine acid-addition salt;
   k. dissolving the D-(−)-2-(p-hydroxyphenyl)glycine acid-addition salt in water and adding an acid-acceptor to precipitate D-(−)-2-(p-hydroxyphenyl)glycine; and
   l. separating the D-(−)-2-(p-hydroxyphenyl)glycine.

2. In a process according to claim 1 the sequential steps of:
   a. treating the L-(+)-R 2-(p-hydroxyphenyl)glycinate L-(−)-dibenzoylbitartrate with aqueous strong acid containing an excess of one equivalent of said strong acid to precipitate L-(−)-dibenzoyltartaric acid;
   b. separating the precipitated L-(−)-dibenzoyltartaric acid;
   c. heating a solution of the strong acid from which the L-(−)-dibenzoyltartaric acid was separated;
   d. evaporating the strong acid solution to yield L-(+)-2-(p-hydroxyphenyl)glycine acid-addition salt;
   e. dissolving the L-(+)-2-(p-hydroxyphenyl)glycine acid-addition salt in water and adding an acid-acceptor to precipitate L-(+)-2-(p-hydroxyphenyl)glycine; and
   f. separating the L-(+)-2-(p-hydroxyphenyl)glycine.

3. A process for the separation of D,L-(±)-2-(p-hydroxyphenyl)glycine into its optically active enantiomers which comprises the sequential steps of:
   a. converting D,L-(±)-2-(p-hydroxyphenyl)glycine to a D,L-(±)-R 2-(p-hydroxyphenyl)glycinate, where R is selected from lower-alkyl and benzyl;
   b. reacting the D,L-(±)-2-(p-hydroxyphenyl)glycinate with D-(+)-dibenzoyltartaric acid, in a mole ratio of said acid to said glycinate of from greater than 0.5 to less than 1, in a solvent selected from lower-alkanol and acetone;
   c. diluting a solution so obtained with water to precipitate D-(−)-R 2-(p-hydroxyphenyl)glycinate D-(+)-dibenzoylbitartrate;
   d. separating the D-(−)-R 2-(p-hydroxyphenyl)glycinate D-(+)-dibenzoylbitartrate;
   e. adding to an aqueous solution from which said D-(−)-R 2-(p-hydroxyphenyl)glycinate D-(+)-dibenzoylbitartrate was separated about a molar amount of D-(+)-dibenzoyltartaric acid equal to the excess of the molar amount of D,L-(±)-R 2-(p-hydroxyphenyl)glycinate over that of the D-(+)-dibenzoyltartaric acid employed in step b to precipitate L-(+)-R 2-(p-hydroxyphenyl)glycinate D-(+)-dibenzoylbitartrate;
   f. separating L-(+)-R 2-(p-hydroxyphenyl)glycinate D-(+)-dibenzoylbitartrate;
   g. treating the L-(+)-R 2-(p-hydroxyphenyl)glycinate D-(+)-dibenzoylbitartrate with aqueous strong acid containing an excess of one equivalent of said strong acid to precipitate D-(+)-dibenzoyltartaric acid;
   h. separating the precipitated D-(+)-dibenzoyltartaric acid;
   i. heating a solution of the strong acid from which the D-(+)-dibenzoyltartaric acid was separated;
   j. evaporating said strong acid solution to yield L-(+)-2-(p-hydroxyphenyl)glycine acid-addition salt;
   k. dissolving the L-(+)-2-(p-hydroxyphenyl)glycine acid-addition salt in water and adding an acid-acceptor to precipitate L-(+)-2-(p-hydroxyphenyl)glycine; and
   l. separating the L-(+)-2-(p-hydroxyphenyl)glycine.

4. In a process according to claim 3 the sequential steps of:
   a. treating the D-(−)-R 2-(p-hydroxyphenyl)glycinate D-(+)-dibenzoylbitartrate with aqueous strong acid containing an excess of one equivalent of said strong acid to precipitate D-(+)-dibenzoyltartaric acid;
   b. separating the precipitated D-(+)-dibenzoyltartaric acid;
   c. heating a solution of the strong acid from which the D-(+)-dibenzoyltartaric acid was separated;
   d. evaporating the strong acid solution to yield D-(−)-2-(p-hydroxyphenyl)glycine acid-addition salt;
   e. dissolving the D-(−)-2-(p-hydroxyphenyl)glycine acid-addition salt in water and adding an acid-acceptor to precipitate D-(−)-2-(p-hydroxyphenyl)glycine; and
   f. separating the D-(−)-2-(p-hydroxyphenyl)glycine.

5. A process according to claim 1 wherein R is lower-alkyl.

6. A process according to claim 5 wherein R is ethyl.

7. A process according to claim 6 where in step c the solution is diluted with an amount of water such that a ratio of water to the solvent of about 1.32 results.

8. A process according to claim 7 where in step b the mole ratio is from about 0.7 to about 0.8 and the solvent is lower-alkanol.

9. A process according to claim 2 where R is lower-alkyl.

10. A process according to claim 9 where R is ethyl.

11. A process according to claim 3 where R is lower-alkyl.

12. A process according to claim 11 where R is ethyl.

13. A process according to claim 12 where in step c the solution is diluted with an amount of water such that a ratio of water to the solvent of about 1.32 results.

14. A process according to claim 13 where in step b the mole ratio is from about 0.7 to about 0.8 and the solvent is lower-alkanol.

15. A process according to claim 4 where R is lower-alkyl.

16. A process according to claim 15 where R is ethyl.

17. A compound selected from L-(+)-R 2-(p-hydroxyphenyl)-glycinate D-(+)-dibenzoylbitartrate, D-(−)-R 2-(p-hydroxyphenyl)- glycinate D-(+)-dibenzoylbitartrate, L-(+)-R 2-(p-hydroxyphenyl)-glycinate L-(−)-dibenzoylbitartrate, and D-(−)-R 2-(p-hydroxyphenyl)glycinate L-(−)-dibenzoylbitartrate, where R is selected from lower-alkyl and benzyl.

18. A compound according to claim 17 where R is lower-alkyl.

19. L-(+)-Ethyl 2-(p-hydroxyphenyl)glycinate D-(+)-dibenzoylbitartrate according to claim 18.

20. D-(−)-Ethyl 2-(p-hydroxyphenyl)glycinate D-(+)-dibenzoylbitartrate according to claim 18.

21. L-(+)-Ethyl 2-(p-hydroxyphenyl)glycinate L-(−)-dibenzoylbitartrate according to claim 18.

22. D-(−)-Ethyl 2-(p-hydroxyphenyl)glycinate L-(−)-dibenzoylbitartrate according to claim 18.

* * * * *

UNITED STATES PATENT AND TRADEMARK OFFICE
CERTIFICATE OF CORRECTION

PATENT NO. : 3,832,388
DATED : August 27, 1974
INVENTOR(S) : Roman R. Lorenz

It is certified that error appears in the above—identified patent and that said Letters Patent are hereby corrected as shown below:

Column 1, line 59, "L (+)" should read -- L-(+) --.

Column 2, line 14, "-(+)-" should read -- -($\pm$)- --.

$\mathcal{S}$igned and $\mathcal{S}$ealed this

Twenty-third Day of November 1976

[SEAL]

Attest:

RUTH C. MASON
*Attesting Officer*

C. MARSHALL DANN
*Commissioner of Patents and Trademarks*